United States Patent [19]

Jandrasi

[11] 4,331,316
[45] May 25, 1982

[54] SHUT-OFF VALVE FOR HIGH TEMPERATURE EROSIVE FLOW

[75] Inventor: Frank J. Jandrasi, Houston, Tex.

[73] Assignee: General Signal Corporation, Stamford, Conn.

[21] Appl. No.: 209,090

[22] Filed: Nov. 21, 1980

[51] Int. Cl.³ .............................................. F16A 25/00
[52] U.S. Cl. ...................................... 251/86; 251/298; 137/375; 137/468
[58] Field of Search ........................... 251/86, 87, 298; 137/375, 468

[56] References Cited

U.S. PATENT DOCUMENTS

| | | | |
|---|---|---|---|
| 1,647,036 | 10/1927 | Dileo | 251/298 |
| 1,980,495 | 11/1934 | Muir | 251/298 |
| 2,998,957 | 9/1961 | Vulliez | 251/298 |
| 3,972,504 | 8/1976 | Disabatino, Jr. | 251/298 |
| 4,033,549 | 7/1977 | Stamer | 251/298 |

*Primary Examiner*—H. Jay Spiegel
*Attorney, Agent, or Firm*—Fulbright & Jaworski

[57] ABSTRACT

A shut-off valve for high temperature erosive flow is disclosed having a valve and a valve engaging or seating portion in which substantial erosion of an area beginning at its initial erosion point adjacent the valve seat does not erode the valve seating portion of the valve seat and the valve seating portion of the valve member to prevent closing of the valve or to cause leaks. The valve has limited but enough universal movement to be self-seating to accommodate thermal growth. The valve and valve seat can be removed from the valve without taking the valve off the line. A number of embodiments are disclosed.

6 Claims, 8 Drawing Figures

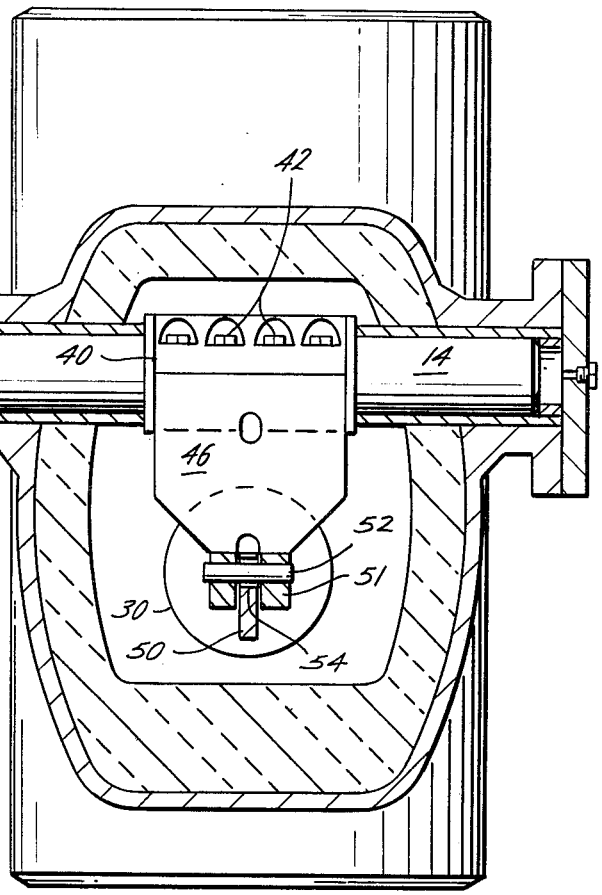
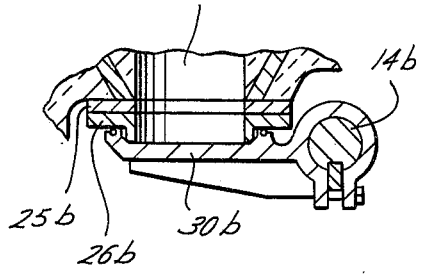
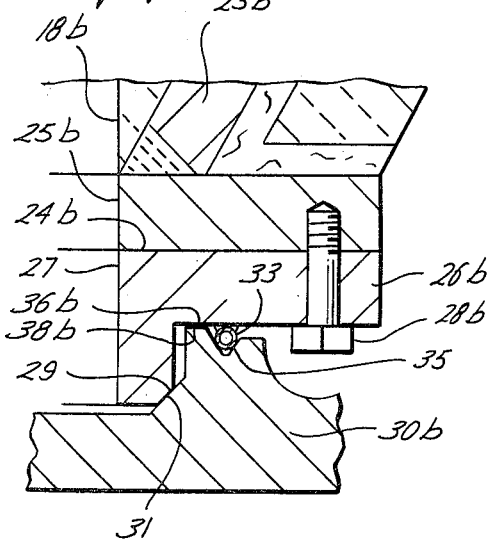
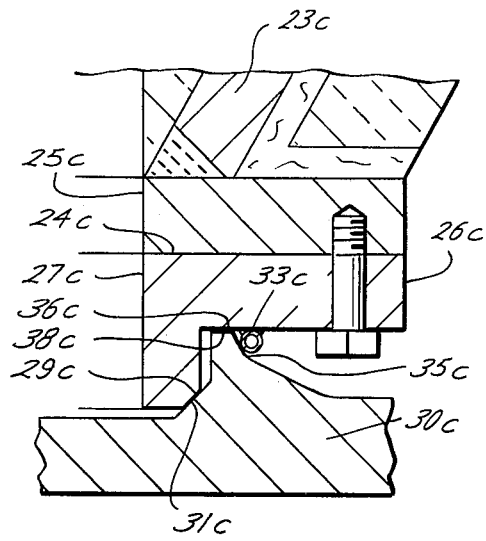

SHUT-OFF VALVE FOR HIGH TEMPERATURE EROSIVE FLOW

BACKGROUND OF THE INVENTION

There has been a serious erosion problem with valves used in high temperature erosive solid or fluid flow in that the valve seat or portions of the valve seat are eroded or abraded away by the flow causing leaks and a failure of the valve to shut-off flow when desired. In addition, there is a problem with valves used for high temperature erosive or abrasive flows to provide adequate seating and hence sealing of the valve member on the valve seat due to thermal growth caused by the extremely high temperatures.

SUMMARY OF THE INVENTION

The present invention is directed to a shut-off valve suitable for use for high temperature erosive flow, such as in refineries in which considerable erosion of the flow passage adjacent the valve or a portion of the valve seat can and does take place without destroying the ability of the valve to effectively shut-off flow through the valve and to prevent leaks.

The present invention is also directed to such a valve which compensates for thermal growth of the valve so that an effective shut-off by the valve is provided under varying temperature conditions. In addition, the present invention is directed to such a valve for high temperature erosive flow and to accomodate thermal growth in which the valve seat and valve can be removed for repair or replacement without removing the valve from the line.

In short, the valve includes a body having a flow passage through it, the flow passage including an enlarged internal chamber. The valve is arranged so that the seating surface or surface of the valve seat and the seating surfaces of the valve member are beyond the initial erosion point and a substantial distance downstream thereof, a substantial erosion area of the valve, so that the shut-off valve effectively shuts-off flow through the valve even though there is substantial erosion of the flow passage or a portion of the valve seat itself.

The valve member is constructed and arranged so that its seating surface adjustably seats on the valve seating surface effective to compensate for thermal growth.

The valve is also constructed and arranged so that the valve seat, valve, and connecting and operable parts can be removed for repairs, replacements and the like without taking the valve off the line.

Accordingly, it is an object of the present invention to provide a shut-off valve for high temperature erosive flow in which substantial erosion of the flow passage adjacent the valve seat or of a portion of the valve seat itself does not prevent effective shutting-off of flow through the shut off valve.

A further object of the invention is the provision of such a valve in which the seating surfaces of the valve seat and valve member are beyond and out of the direct flow path of the erosive flow through the valve.

A further object of the present invention is the provision of such a valve in which the seating surface of the valve member which seats on the valve seating surface automatically accomodates and adjusts for thermal growth due to the high temperature abrasive flow through the valve effective to provide a shut-off of flow under varying temperature conditions.

A further object of the present invention is the provision of such a valve in which the valve seat, valve member, and connecting and operable parts are removable from the valve for replacement and repairs without removing the valve from the line.

Other and further objects, features and advantages will be apparent from the following description of presently preferred embodiments of the invention given for the purpose of disclosure and taken in conjunction with the accompanying drawings.

BRIEF DESCRIPTION OF THE DRAWINGS

FIG. 5 is a sectional view taken along the section line 5—5 of FIG. 2.

FIG. 6 is a fragmentary view illustrating another embodiment of the valve illustrated in FIG. 2.

FIG. 7 is an enlarged fragmentary view illustrating the seating and sealing arrangement of the valve assembly of FIG. 6.

FIG. 8 is an enlarged view similar to FIG. 7 illustrating a modification of the valve of FIGS. 6 and 7.

DESCRIPTION OF PRESENTLY PREFERRED EMBODIMENTS

Figure 1:
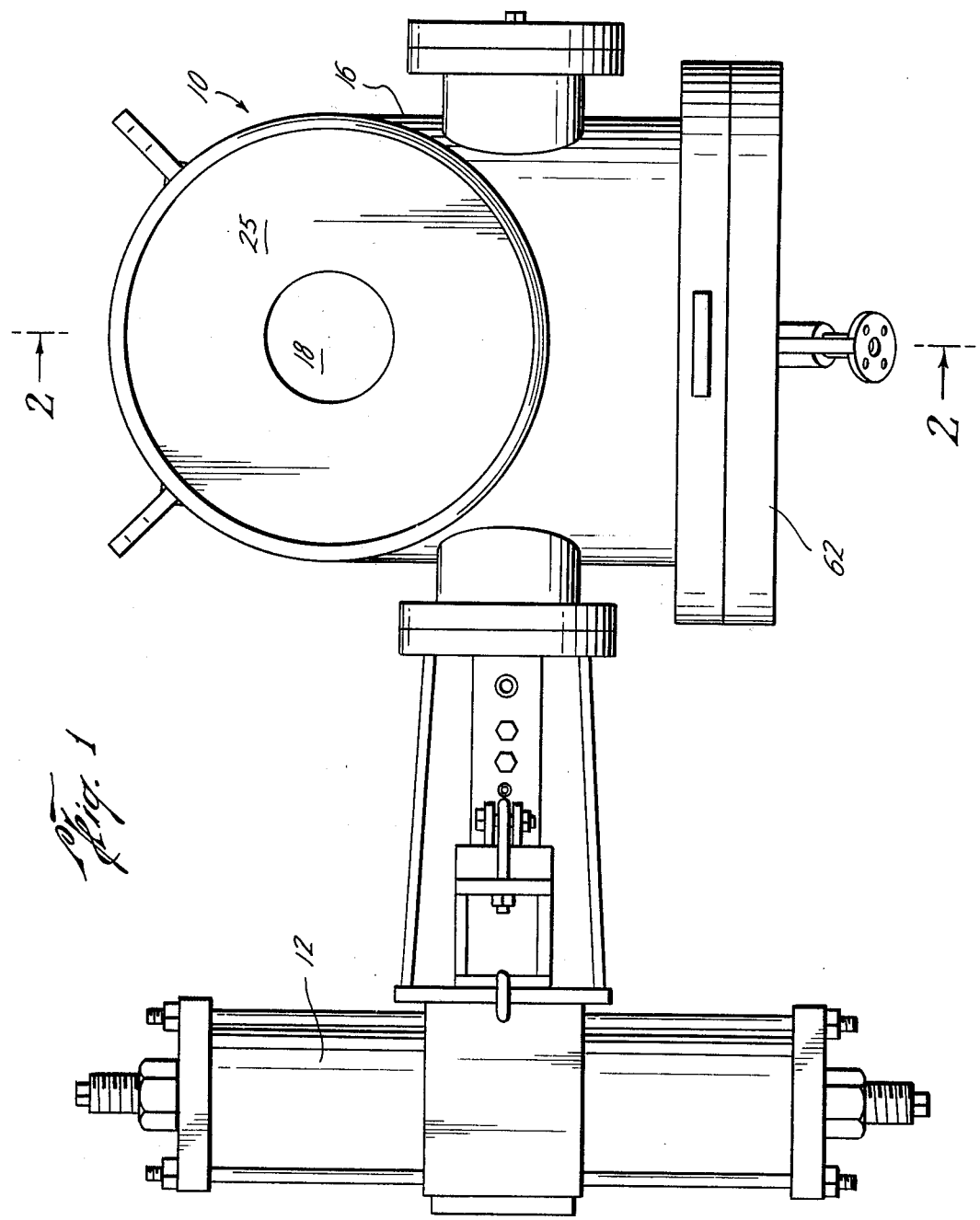
FIG. 1 is a plan view of the valve according to the present invention.

Referring now to the drawings, and particularly to FIG. 1, a valve generally indicated by the reference numeral 10 is illustrated which is here shown as a powered shut-off valve in which the power cylinder arrangement 12 rotates a shaft 14 (not shown in this view but illustrated in FIGS. 2 and 5), for opening and closing the valve.

Figure 2:
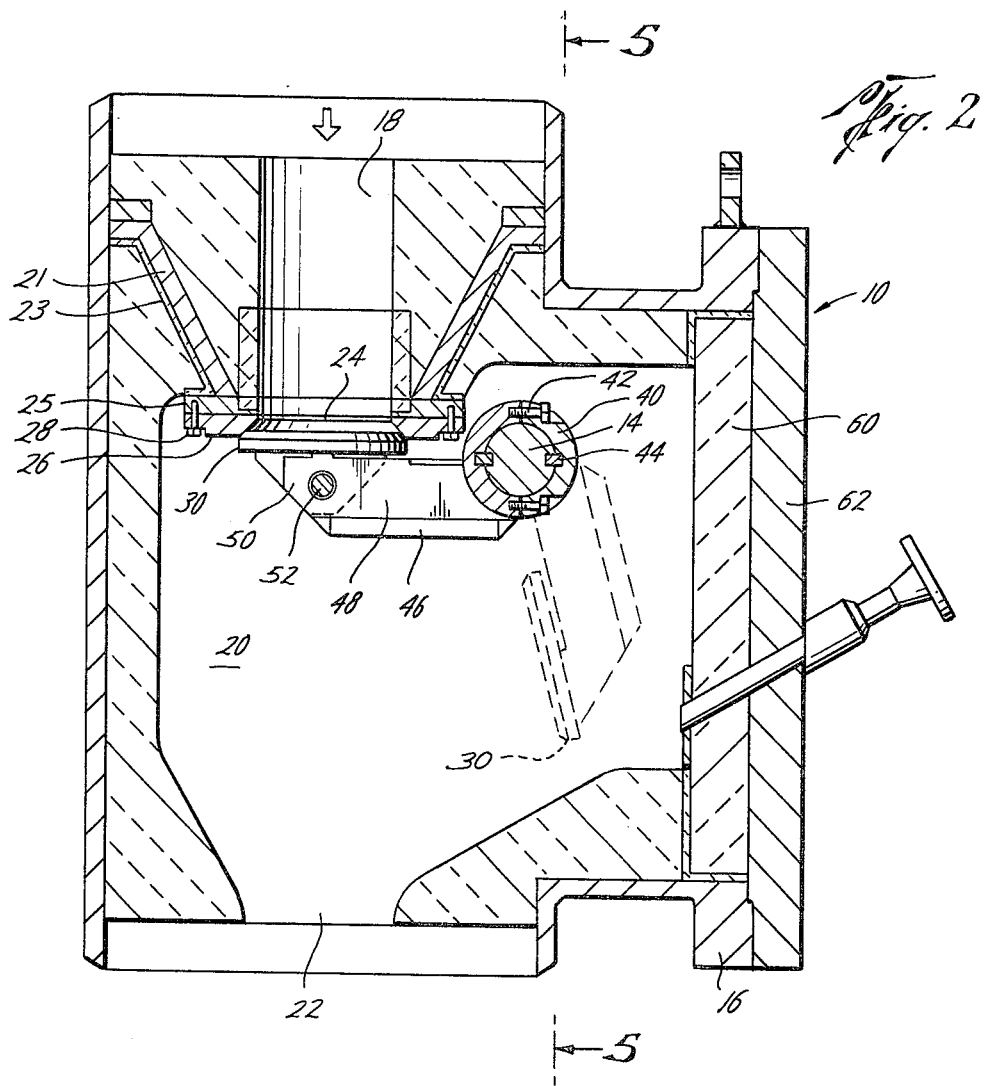
FIG. 2 is a sectional view taken along the line 2—2 of FIG. 1 and illustrating a presently preferred embodiment of the invention.

Referring now to FIG. 2, the valve 10 includes the valve body 16 through which extends the flow passage 18 through the enlarged internal chamber 20 and out the downstream passage 22.

The flow passage 18 has what may be referred to for convenience as an entry 24 into the enlarged internal chamber 20 of the valve body 16. A valve seat 26 is releasably secured to the entry 24 of the flow passage 18, such as by the bolts 28 against which a valve member 30 seats to shut off flow through the valve.

Figure 3:
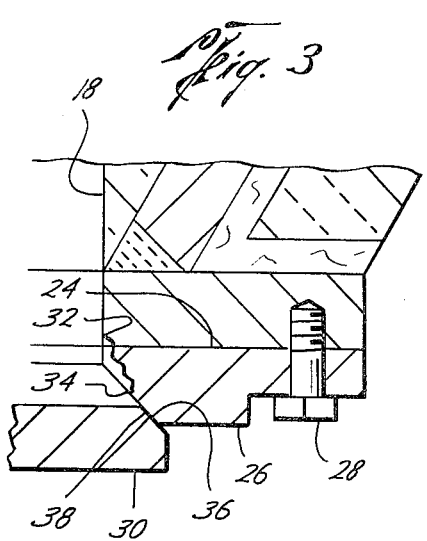
FIG. 3 is an enlarged fragmentary view of the valve seating and valve member portions illustrating closing and sealing with considerable erosion of the valve.

As best illustrated in FIG. 3, there is what may be termed an initial erosion point 32 adjacent and upstream of the entry 24 where erosion caused by the erosive flow through the valve commences to occur. Normally, this erosion extends downstream into the valve seat 26 and provides an area of erosion which begins at the initial erosion point 32 and erodes downstream and, as here shown, ends at the downstream erosion point 34. In the embodiment illustrated in FIGS. 2 and 3, the valve seat 26 has an outwardly tapering or conical valve seating surface 36 extending in the direction of flow and which is beyond in the direction of flow of the erosion area between the initial erosion point 32 and the downstream erosion point 34. The coacting tapered or conical valve member 30 has a valve seating surface 38 which seats on the valve seating surface 36 beyond the erosion area as clearly illustrated in FIG. 3. Thus, although there is a substantial area of erosion of the flow passage and a portion of the valve seat 26, the valve member 30 effectively seats and seals on the valve 26 to effectively shut-off flow through the valve.

Figure 4:
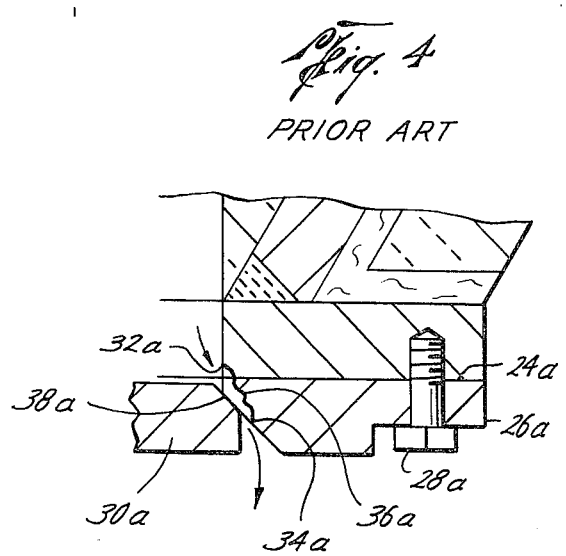
FIG. 4 is a view similar to that of FIG. 3 illustrating a prior art valve arrangement and showing that the same amount or area of erosion as the valve in FIG. 3 prevents shut off of flow through the valve.

Referring now to FIG. 4 in which the reference letter "a" is added to corresponding reference numerals of FIG. 3 for convenience of reference, a prior art valve is illustrated in which the valve seating surface 36a of the valve 26a and the valve seating surface 38a of the valve member 30a are disposed so that the same area of erosion of the valve illustrated in FIG. 3 causes the valve seating surface 36a to be eroded of the prior art valve so that the closing of the valve member 30a does not effectively shut off flow through the valve and, accordingly, the valve seat 26a must be removed and replaced much sooner and hence much more often than a valve according to the present invention as illustrated in FIGS. 2 and 3, which greatly increases the expense of maintenance, operation and shut-down time of the valve.

Referring again to FIG. 2, the drive shaft 14 for rotating the valve 30 into closed and open position is disposed in the enlarged internal chamber 20 and is offset from and out of the direct flow through the enlarged flow passage 20 and the discharge passage 22. In this connection, for convenience of reference, what is referred to as "direct" flow though the valve is a continuation of the tubular flow passage 18 through the enlarged internal chamber 20 and out the discharge 22.

As illustrated in FIGS. 2 and 5, a split sleeve 40 is disposed about the powered drive shaft 14 and is secured about it by means of the bolts 42 although the split sleeve 40 may be so secured in any desired manner. As best shown in FIG. 2, the keys or splines 44 are provided to prevent relative rotation between the split sleeve 40 and the powered drive shaft 14.

A plate-like member 46 generally paralleling the valve member 30 and a second plate-like member 48 generally transverse to the valve member 30 are secured to one of the members of the split sleeve 40. A connecting member 50 is connected to the members 46 and 48 by means of a pin 52 which loosely extends through the opening 54. Similarly, the connecting member 50 loosely fits between the connecting member 51 to permit limited movement in a direction longitudinal to the path of flow through the valve. The valve member 30 is connected to the connecting member 50.

Thus, by means of the connecting illustrated and described, the valve member 30 can move universally with respect to the valve seat 26 and due to the tapered valve seating surface 36 and the valve member engaging surface 38, thermal growth and shrinkage of the valve seat 26 and the valve member 30 is accomodated due to the "float" of the valve member 30 so that an effective seal is accomplished under various thermal growth and shrinkage conditions.

Referring now to FIGS. 6 and 7, another embodiment of the invention is illustrated in which the reference letter "b" has been added to reference numerals of FIGS. 1-5 for convenience of reference.

In this embodiment, the valve seat 26 has the projection 27 which serves as a continuation of the inlet flow passage 18b and has a valve seat 36 which is disposed back of, above and around the entry of the flow into the enlarged portion 20, which is engaged by the valve member seating portion 38b.

As best seen in FIG. 7, the valve seat 27 has a tapered or conical surface 29 on its outer portion and the valve member 30b has a correspondingly tapered or conical surface 31 which engages and seats on the tapered surface 29 when the valve is closed to prevent abrasive flow from flowing around the projecting end of the valve seat 27 and up onto the valve seating surface or portion 36b and the valve member seating portion or surface 38b. To assist in the sealing, a vented flexible metal tube 33 is secured to the valve seating area 36b and the valve engaging portion 38b of the valve member 30b has an annular groove 35 which engages and deflects the resilient tube 33 thus providing a further seal against the metal resilient tube 33 to effect the closure. The metal tube 33 is vented to avoid pressure buildup and possible explosion of the tube if sealed caused by high temperatures. The tube 33 can be vented in any desired manner, such as one or more openings in its wall, not shown.

FIG. 8 illustrates a further modification of the valve shown in FIGS. 6 and 7 and in which the reference letter "c" has been added to numerals corresponding to those in FIGS. 6 and 7 for convenience of reference. This embodiment is identical to that of FIGS. 6 and 7 except that the outer portion of the annular groove 33c is cut away to provide the tapered surface 33c which engages against the flexible tube 33c and provides an effectively sealed closure shutting-off flow through the valve.

In both the embodiments of FIGS. 6 and 7 and of FIG. 8, it is seen that the seating of the valve member against the seating surface of the valve is away from and out of the direct flow of the erosive and abrasive fluids through the valve. Accordingly, considerable erosion of the valve can occur and there still can be an effective closure of the valve shutting-off flow through it.

In the embodiments of FIGS. 6-8, inclusive, the remaining parts and the means for closing and opening the valve are the same as those in FIGS. 1-5, inclusive.

The body 12 comprises an outer shell 16 which can be constructed of low cost, low temperature material such as carbon steel and includes the insulation 60 which is castable insulation, many of which are available on the open market, such as Resco RS-7.

If desired, the insulation may be a refractory material, such as formed of hexmesh and refractory material, many of which are commercially available, such as Resco RA-22.

Also, as best illustrated in FIG. 2, the orifice 25 is supported by a truncated cone 23 which is secured to the outer body shell 16. The truncated cone 23 is lined by a suitable lining material 21, such as Tapco 257, a commercial hardfacing. Similar linings are provided for the orifice plate 25 and, as illustrated, suitable refractory insulation and hardfacing are provided which will withstand the conditions of use, all of which are readily available on the market.

As previously mentioned, the valve seat 26, the valve 30, and connecting parts to the powered shaft 14, can be removed from the valve 10 without taking it off the line by simply removing the bonnet 62 by loosing the bolts, not shown, which is of a size sufficient to permit passage of these components of the valve through it. Thus, the valve can stay on line while repairs and replacements are made to the wear prone parts, thus avoiding substantial expense and shut-down time involved in removing a valve from the line.

Since the embodiments of the invention can be utilized with a wide variety of valves, and means to open and close them, no more description of a particular valve, such as illustrated in FIG. 1, is given or deemed necessary.

The present invention, therefore, is well suited and adapted to attain the objects and ends and has the advantages and features mentioned as well as others inherent therein.

While presently preferred embodiments of the invention have been given for the purpose of disclosure, changes can be made in them which are within the spirit of the invention as defined by the scope of the appended claims.

What is claimed is:

1. A shut-off valve for high temperature erosive flow, comprising, a body provided with a flow passage through it including an inlet extending into an entry portion extending into an enlarged internal chamber which includes an outlet downstream thereof, initial erosion point of the flow passage caused by the erosive flow occurring upstream of the entry, a valve seat disposed in the flow passage adjacent the entry portion into the enlarged internal chamber, the valve seat having an extended conical seating surface downstream of the initial erosion point and out of direct flow through the flow passage, a valve member having a coacting conical valve seating surface arranged to seat on the valve seating surface of the valve seat, means disposed in the enlarged internal chamber operable to rotate the valve member to seat the valve seating surface thereof against the valve seating surface of the valve seat to close the valve and to rotate the valve member out of the direct flow through the flow passage to open the valve, said means including a rotatably mounted shaft disposed in the enlarged internal chamber out of the direct flow path, means connecting the valve to the shaft effective so that rotation of the shaft rotates the valve member and opens and closes the valve, whereby, erosion of the flow passage and valve seat upstream of the conical seating surface of the valve seat does not prevent an effective closure of the valve, said conical valve seating surface of said valve member seating exclusively on the most downstream portion of the extended conical seating surface of said valve seat with erosion of said extended conical seating surface of said valve seat occurring only at the most upstream portion thereof, said upstream and downstream portions being spaced apart.

2. The shut-off valve of claim 1, where,
the conical valve seat tapers outwardly of and downstream of the flow through the flow passage, and
the valve seating surface of the valve member is tapered and arranged to seat only on the valve seating surface of the valve seat.

3. The shut-off valve of claim 1, where,
the valve seat, the valve member and connecting parts of the means to rotate the valve member are removably disposed,
the body includes an opening of a size large enough to permit removal through it of the valve seat, the valve member and the connecting parts, and including
a bonnet releasably closing the opening.

4. A shut-off valve for high temperature erosive flow, comprising, a body provided with a flow passage through it including an inlet extending into an entry portion extending into an enlarged internal chamber which includes an outlet downstream thereof, initial erosion point of the flow passage caused by the erosive flow occurring upstream of the entry, a valve seat disposed in the flow passage adjacent the entry portion into the enlarged internal chamber, the valve seat having an extended conical seating surface downstream of the initial erosion point and out of direct flow through the flow passage, a valve member having a coacting conical valve seating surface arranged to seat on the valve seating surface of the valve seat, means disposed in the enlarged internal chamber operable to rotate the valve member to seat the valve seating surface thereof against the valve seating surface of the valve seat to close the valve and to rotate the valve member out of the direct flow through the flow passage to open the valve, said means including a rotatably mounted shaft disposed in the enlarged internal chamber out of the direct flow path, means connecting the valve to the shaft permitting universal movement of the valve member effective to accomodate thermal growth and shrinkage of the valve to sealingly seat the seating surface of the valve member against the seating surface of the valve, whereby, erosion of the flow passage and valve seat upstream of the conical seating surface of the valve seat does not prevent an effective closure of the valve said conical valve seating surface of said valve member seating exclusively on the most downstream portion of the extended conical seating surface of said valve seat with erosion of said extended conical seating surface of said valve seat occurring only at the most upstream portion thereof, said upstream and downstream portions being spaced apart.

5. The shut-off valve of claim 4, where,
the conical valve seat tapers outwardly of and downstream of the flow through the flow passage, and
the valve seating surface of the valve member is tapered and arranged to seat only on the valve seating surface of the valve seat.

6. The shut-off valve of claim 4, where,
the valve seat, the valve member and connecting parts of the means to rotate the valve member are removably disposed,
the body includes an opening of a size large enough to permit removal through it of the valve seat, the valve member and the connecting parts, and including
a bonnet releasably closing the opening.

* * * * *